United States Patent Office 3,494,744
Patented Feb. 10, 1970

3,494,744
METHOD FOR DETERMINATION OF PROTEIN-BOUND IODINATED COMPONENTS
George Zborowski, San Francisco, Calif., assignor to Bio-Rad Laboratories, Richmond, Calif., a corporation of California
No Drawing. Filed Oct. 26, 1967, Ser. No. 678,189
Int. Cl. G01n *33/16, 31/04*
U.S. Cl. 23—230                            5 Claims

ABSTRACT OF THE DISCLOSURE

Thyroxine which has been separated from serum with ion exchange resin so that substantially all protein is removed, is reacted with bromine that is formed in situ by the reaction between bromate and bromide ions in an acid solution. The bromine liberates iodine from the thyroxine which is quantitated by the arsenous-ceric reaction.

---

This invention relates to the determination of serum thyroxine which has been separated from serum with anion exchange resin. More particularly, the invention provides an improved manual procedure for liberating iodine from the thyroxine for colorimetric quantitation.

The isolation and elution of thyroxine on an anion exchange resin has been reported in the literature, see for example J. Clin. Endocr. and Meta, 21:1272, 1961. Once the thyroxine is eluted from the resin, it is of course necessary to determine its concentration. One standard method reported by Pileggi et al. in the above cited work involves the Barker dry ash method which requires extensive incineration in a special furnace. The costliness of the equipment and time needed for carrying out such a procedure detracts from the usefulness of the entire method for determining thyroxine.

It has been found that the eluate obtained when the thyroxine is separated from serum with an ion exchange resin, and particularly where the resin is utilized in a column form, can be recovered substantially free from protein. Because of the absence of protein, the undesirable incineration technique is not needed. Instead it is possible to react the pure thyroxine with bromine. The bromine oxidizes the thyroxine iodide that is part of the thyroxine molecular structure to yield free iodine. The free iodine is then conveniently determined by a simple colorimetric procedure such as by the arsenous-ceric reaction.

While bromine water can be added to the protein free thyroxine eluate to accomplish the oxidation and liberation of free iodine, the use of bromine water is most undesirable. Bromine water is a highly unstable reagent which must be relatively freshly prepared prior to use. Moreover, free bromine is a noxious, toxic, and dangerous chemical which is generally unwelcome in a laboratory where thyroxine determinations would be carried out. This is a most important factor when the level of the training of the typical medical technician employed for making these tests is considered.

In accordance with the present invention the speed, simplicity and economy of the bromine-thyroxine reaction is obtained without the use of the undesirable bromine water reagent. To this end a solution containing bromate and bromide ions in the presence of acid is employed. Such a solution generates bromine in situ for reaction with thyroxine according to the equation:

$$BrO_3^- + 5Br^- + 6H^+ \rightarrow 3Br_2 + 3H_2O$$

The bromate and bromide solutions are essentially stable indefinitely, and are harmless with respect to the technician performing the test. Thus all of the advantages of the bromine-thyroxine reaction (compared with the dry ash method) are obtained but without the hazards connected with the use of bromine water.

In the preferred embodiment a suitable bromate salt such as an alkali metal salt and a suitable bromide salt such as an alkali metal bromide are prepared in an aqueous solution. A suitable source of acid such as sulfuric acid together with the bromate/bromide solution are added to the thyroxine eluate and allowed to stand at reaction temperature, preferably at room temperature, for a sufficient time to generate bromine in situ and permit the generated bromine to react with the thyroxine to liberate free iodine. The free iodine can then be determined by any convenient procedure. In the preferred embodiment the conventional arsenous-ceric reaction is used for quantitation with a colorimeter.

In the preferred embodiment, in accordance with the above equation the bromate and bromide ions are present in about a 1:5 molar ratio respectively, and preferably an excess of the acid is used to drive the reaction in the desired direction. Preferably sufficient of the reagents are used to generate an excess of bromine relative to the amount of thyroxine in the eluate.

The present improvement is applicable only to thyroxine eluates obtained by anion exchange resin separations of the thyroxine. Only by this technique can the thyroxine be obtained in a form sufficiently free from protein so that the prior incineration methods need not be used. If the thyroxine is not sufficiently free of protein, turbulence and/or a precipitate would be introduced which might destroy the accuracy of the determination. In the preferred anion exchange resin column separation, the protein is substantially entirely removed and a relatively gentle digestion can be used for liberation of the iodine.

The following example will illustrate the practice of the present improvement. A thyroxine eluate is obtained by separation on an anion exchange resin column. A preferred technique for performing this preliminary step is described in co-pending patent application Ser. No. 668,603 filed Sept. 16, 1967. The following solutions are then utilized:

(A) 4 N $H_2SO_4$.
(B) Bromate-bromide solution—0.42 gm. $KBrO_3$ plus 1.5 gms. KBr/liter $H_2O$.
(C) Arsenous solution—5.0 gms. of $NaAsO_2$ is dissolved in 400 ml. of water. 4 N $H_2SO_4$ is added to pH 7. Add 250 ml. of 4 N $H_2SO_4$ and bring to volume of 1 liter.
(D) Ceric solution—48.6 ml. of concentrated $H_2SO_4$ added to approx. 0.5 liter of $H_2O$. 40 gm. ceric ammonium sulfate is dissolved in this solution.

To a 3 ml. eluate containing thyroxine from which substantially all protein has been removed by suitable washing, 0.5 ml. 4 N $H_2SO_4$ and 0.4 ml. bromate-bromide solution are added. The solutions are mixed and allowed to stand at room temperature for 10 minutes. This will cause bromine to be generated in situ which reacts to oxidize iodide in the thyroxine to free iodine.

The iodine may then be conveniently quantitated as follows:

(1) Add 1.0 ml. of arsenous solution and place in 37° C. bath; allow to come to bath temperature—about 5 minutes.
(2) At timed intervals (15, 30, or 45 second) add 1.0 ml. of ceric solution. Keep in 37° C. bath for 20 minutes. Then read in a colorimeter at 420 m$\mu$ at the same time intervals at which the ceric solution was added.

The observed results are then applied to a standard thyroxine curve to obtain values for the sample being investigated.

What is claimed is:

1. In the quantitative determination of thyroxine in an eluate which has been separated from serum with ion exchange resin and in which said eluate is treated with bromine preparatory to the measurement of iodine, the improvement which comprises adding bromate and bromide ions directly to said eluate in its initially separated form in the presence of acid to generate bromine in situ for reaction with the thyroxine in said eluate.

2. The improvement in accordance with claim 1 wherein said bromate and bromide are added as alkali metal salts in a molar ratio of about 1:5 of bromate to bromide, and said acid is present in an excess and is sulfuric acid.

3. An improved manual method for thyroxine analysis comprising: separating thyroxine from serum by flowing the serum through an anion exchange resin column and recovering thyroxine in a relatively small elution volume; adding bromide and bromate ions in the presence of a strong acid to liberate bromine which will react with the thyroxine and release free iodine therefrom; said bromide and bromate ions being added directly to said elution volume in its initially recovered form and in the absence of further purification thereof; and colorimetrically quantitating the released free iodine.

4. The improved method in accordance with claim 3 wherein the reaction between the bromate/bromide and thyroxine to release free iodine is executed at room temperature.

5. The method in accordance with claim 3 wherein color is developed for said colorimetric quantitation by addition of arsenous-ceric reagents at about 37° C.

References Cited

UNITED STATES PATENTS 3,389,968   6/1968   Masen.

OTHER REFERENCES

Pileggi, V. J. et al., J. Clin. Endocr. and Meta., vol. 21, pp. 1272–9 (1961).

MORRIS O. WOLK, Primary Examiner

ELLIOTT A. KATZ, Assistant Examiner

U.S. Cl. X.R.

252—408; 424—7